(12) United States Patent
Clark

(10) Patent No.: US 7,870,620 B2
(45) Date of Patent: Jan. 18, 2011

(54) PORTABLE URINAL SYSTEM

(76) Inventor: Suzanne Clark, 101 Fudora Cir., Simpsonville, SC (US) 29681

( * ) Notice: Subject to any disclaimer, the term of this patent is extended or adjusted under 35 U.S.C. 154(b) by 1165 days.

(21) Appl. No.: 11/503,481

(22) Filed: Aug. 11, 2006

(65) Prior Publication Data

US 2007/0083988 A1    Apr. 19, 2007

(51) Int. Cl.
*A61G 9/00* (2006.01)
(52) U.S. Cl. .................. 4/452; 4/479; 4/144.2
(58) Field of Classification Search ............ 4/450–453, 4/479, 483, 484, 144.1–144.3
See application file for complete search history.

(56) References Cited

U.S. PATENT DOCUMENTS

| 4,759,086 | A | * | 7/1988 | Booth-Cox | 4/451 |
| 4,882,794 | A | * | 11/1989 | Stewart, III | 4/451 |
| 5,224,223 | A | * | 7/1993 | Royal | 4/451 |
| 6,115,855 | A | * | 9/2000 | Lorenzo | 4/484 |
| 7,150,050 | B2 | * | 12/2006 | Sharp | 4/484 |
| 7,530,121 | B2 | * | 5/2009 | Snider | 4/144.2 |

* cited by examiner

*Primary Examiner*—Huyen Le

(57) ABSTRACT

A portable toilet for holding waste includes a base having an aperture, an insert for being mounted in the base. The insert includes a first collar coupled to a first container, a second collar, and a second container and the insert including a pad between the first container and the second container.

14 Claims, 6 Drawing Sheets

PORTABLE URINAL SYSTEM

PRIORITY

The present invention claims priority based on 35 USC section 119 and provisional application Ser. No. 60/727,555 filed on Oct. 18, 2005.

FIELD OF THE INVENTION

The present invention relates to portable toilets having a disposable liner and more particularly to a portable toilet for a general use at any time when such toilets would be useful for example in the car or camping.

BACKGROUND OF THE INVENTION

There has long been portable toilets for use at construction and camping sites. These toilets have often been little more than large bowls requiring sanitary cleaning after each use and being inconvenient for many users.

As we have become a more mobile society, the use of the automobile has been increasing over the years. However, public toilets have been decreasing in numbers especially along the long stretches of empty highways.

A toilet may be available at a service station; however, these service station toilets are usually not cleaned frequently, and these service station toilets are unappealing and may spread disease. It would be desirable to be able to avoid the service station toilets in order to prevent disease.

Furthermore, public toilets may be unsafe and visited by predators especially during the late evening hours. It would be desirable to be able to avoid these public toilets despite their availability.

Bedpans for capturing the release of waste from bedridden individuals are known in the art. Bedpans can have various sizes and shapes depending upon their use and can be composed of materials including both metal and plastic and are either reusable or disposable.

U.S. Pat. No. 5,903,932 to Whitesel discloses a portable toilet seat arranged to receive a liner. The liner is a film of hydrophobic material with a drainage pad attached to the center.

U.S. Pat. No. 6,385,790 to Abraham discloses a portable toilet apparatus which includes a seat elevating structure. The seat elevating structure preferably includes an annular bellows having a tubular accordion outer bellows sidewall, an annular upper bellows wall an annular lower bellows wall.

U.S. Pat. No. 6,532,605 to Howell discloses a liner which may be readily utilized in a toilet receptacle such as a child's potty or a bedpan.

U.S. Pat. No. 6,789,277 to Spitzer discloses a method and apparatus to collect dispose and measure liquid output from bedridden individual.

SUMMARY OF THE INVENTION

It is an object of the invention to provide a simple design which can be made in different sizes. In youth or adult sizes, the toilet may be used by either gender while in the automobile, boat, plane or camping or at a location with no active plant plumbing.

It is an object of the invention to provide a toilet which does not require chemicals and which does not require cleaning. Consequently, it is an object of the invention to provide a toilet with all the convenience of a disposable diaper.

It is an object of the invention to make use of the toilet and having the necessary accessories to protect the seat of the vehicle and to ensure the privacy of the user of the toilet.

It is in the object of the invention to provide a self-contained portable device which may be sealed and carried safely.

Is an object of the invention to provide a self-contained portable device which is biodegradable.

It is an object of the invention to provide a portable toilet apparatus which can be reduced in overall size in order for a compact storage.

It is an object of the present invention to provide an apparatus which is lightweight, durable and inexpensive to manufacture.

It is an object of the present invention to provide a self-contained portable device which can be used to avoid service station toilets and which can be used to avoid public toilets especially during late evening hours.

The present invention includes an annular base having an aperture to accept an insert for the base. The insert includes a pad to absorb liquid, a first collar, a second collar and an inner container of flexible material.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

The term excrement or waste as used herein is meant to include but not limited to urine, solid and liquid feces, stool, body fluids, vomit and any other substance cast out as waste from the body.

The term super-absorbing material as used herein is meant to include but is not limited to a gel, silica, resins such as hydrolyzed starch-acylonitrile graft polymers or neutralized starch-acrylic acid graft polymer, absorbent powders, desiccating agents, chemical compounds such as polyacylamide, polyacrylate or potassium, crystals and other similar liquid absorbing substances or materials known to the skill in the art.

The term absorption mechanism or absorbent layer material is used herein is a layer of material that is absorbent to various materials for example, the absorbent layer material could be made of materials including but not limited to artificial and natural fibers, paper materials, sponge, cloth, cotton and any other similar liquid absorbing materials known to those skilled in the art. The absorption layer material optionally has a super absorbing material that has increased liquid absorbency.

The term attachment apparatus is meant to include but not limited to Velcro, snaps, buttons, string, glue, tape, adhesive elastic, fasteners and any other affixing devices known to those skilled in the art.

The present invention is applicable for use in any setting including but not limited to cars, airplanes, trucks, trailers, boats, the vast outdoors, homes, playing, hiking, hospitals, medical offices, emergency rooms, public and private facilities or any other similar setting where the device could be needed by the individual.

Figure 1:
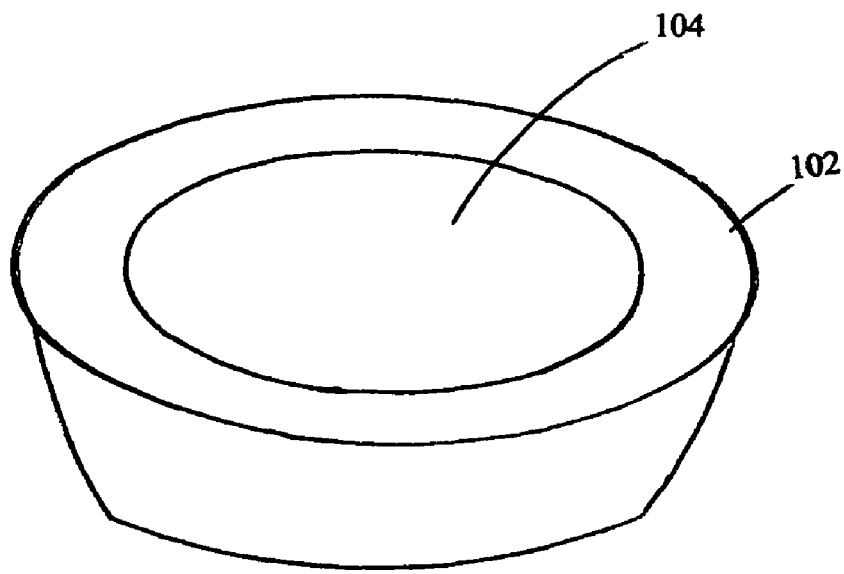
FIG. 1 illustrates a perspective view of the base of the present invention.

FIG. 1 illustrates a perspective view of the base 102 of the present invention which is shown for illustration as annular but could be other shapes. The base 102 could be formed from plastic, polyurethane, metal, glass, polymers, or a foam material such as polyethylene and various polymers and other similar liquid impervious materials known to those of skill in the art. Alternatively, the base 102 could be formed from a hollow flexible material such as an air filled inner tube. Additionally, the annular base 102 could be formed from a biodegradable material so that it can be used safely with landfills and fills. One variation uses a starch based material which may require a water resistant sleeve so that it will not dissolve. The annular base 102 includes an aperture 104 for accepting the insert 410.

Figure 2:
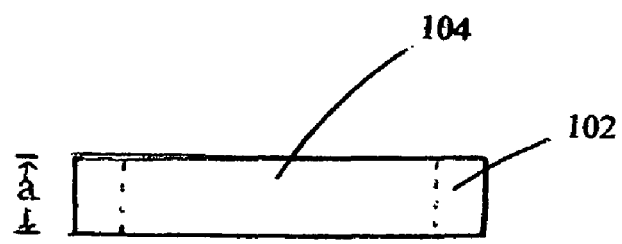
FIG. 2 illustrates a cross-sectional view of the side of the base of the present invention.

FIG. 2 illustrates a cross-sectional view of the side of the annular base 102. The dimension 'a' should approximate the dimension 'b' as shown in FIG. 5.

Figure 3:
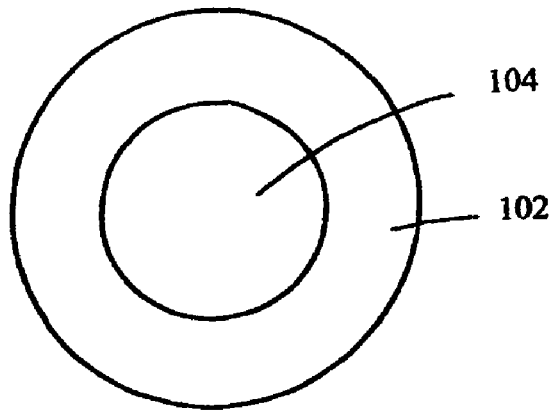
FIG. 3 illustrates a view of the top of the base of the present invention.

FIG. 3 illustrates a view of the top of the annular base 102 showing the aperture 104.

Figure 4:
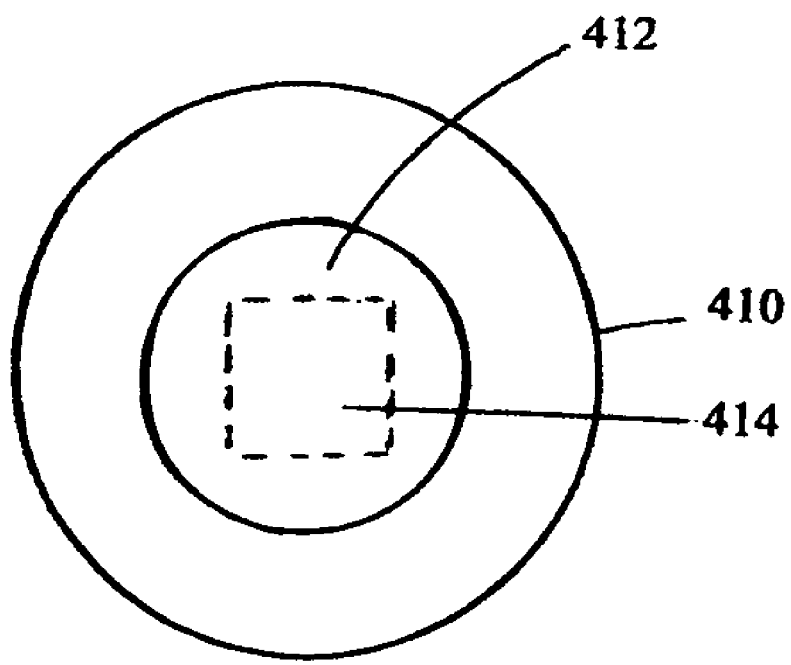
FIG. 4 illustrates a view of the top of the insert of the present invention.

FIG. 4 illustrates a view of the top of the insert 104 including a receptacle 412 for the waste.

Figure 5:
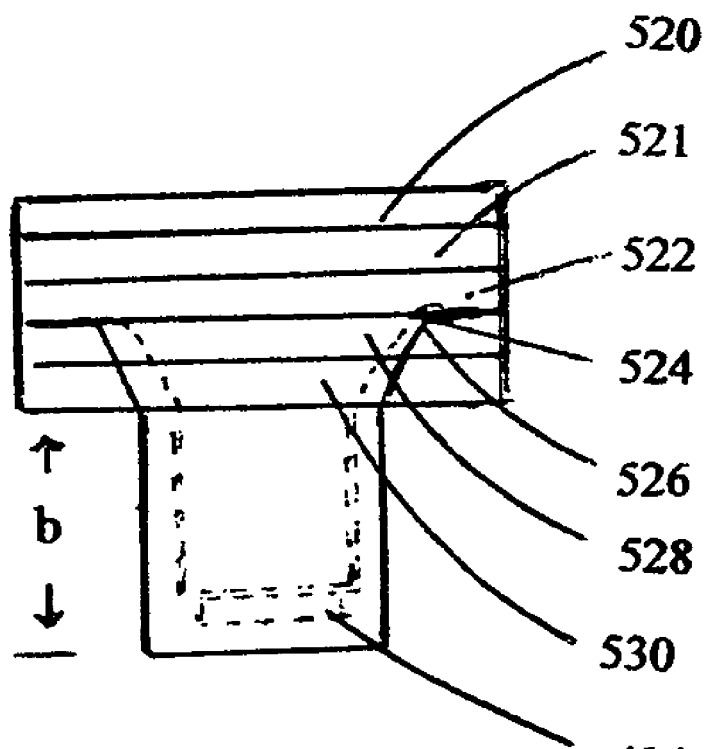
FIG. 5 illustrates a cross-sectional view of the side of the insert of the present invention.

FIG. 5 illustrates a cross-sectional view of the side of the insert 410. The receptacle 412 for the waste includes an inner container 524 which may be formed from flexible absorbent material, an outer container 526 which may be water resistant and formed from flexible absorbent material and a pad 414 formed from absorbent material to absorb liquid. The pad 414 may be positioned between the inner container 524 and the outer container 526 to form a bag like structure.

The insert 410 additionally includes a first collar 522 and a second collar 528, both of which may be formed from rigid material and substantially conforms to the base 102. The inner container 524 and the outer container 526 extend to and are attached between the first collar 522 and the second collar 528. The attachment apparatus attaches the first collar 522, the inner container 524, the outer container 526 and the second collar 528 together around the periphery of the insert 410. Optionally, a first sheet 520 may extend over the top surface of the first collar 522 and may be formed from absorbent material in order to absorb escaping liquid. In a similar fashion, a second sheet 530 may extend over the bottom surface of the second collar 528 in order to absorb escaping liquid. Optionally, additional absorbent layers 521, for example five or six layers, maybe positioned between the first sheet 520 and the second sheet 530. The first sheet 520, the first collar 522, the second collar 528 and the second sheet 530 have dimensions which correspond to the dimensions of the base 102.

Figure 6:
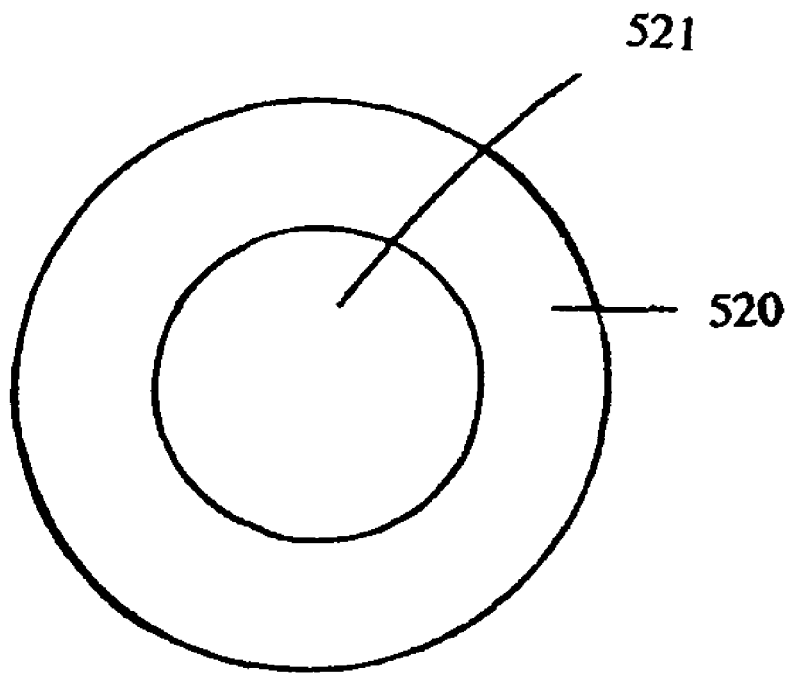
FIG. 6 illustrates a view of the top of the first sheet of the present invention.

FIG. 6 illustrates a view of the top of the first sheet 520 having an aperture 521 corresponding in dimensions approximately to the aperture 104. The collar 522, 528 may fold and may possibly be sealed by tabs and placed into a refuse bag provided in the kit.

Figure 7:
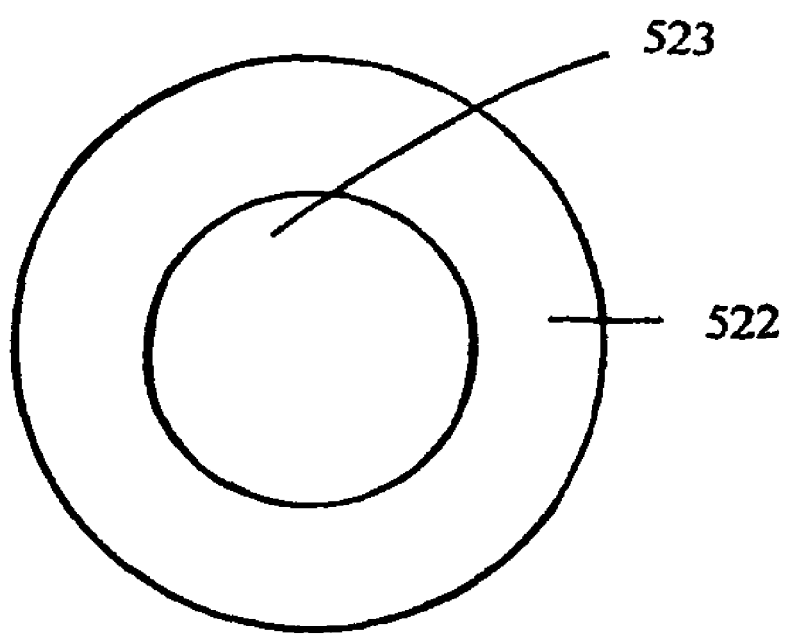
FIG. 7 illustrates a view of the top of the first collar of the present invention.

FIG. 7 illustrates a view of the top of the first collar 522 having an aperture 523 which corresponds to the dimensions approximately of the aperture 104.

Figure 8:
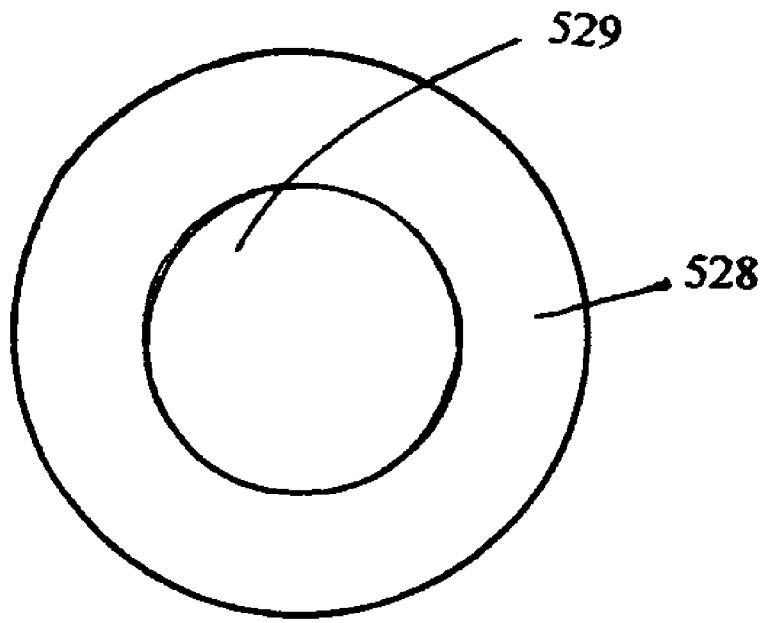
FIG. 8 illustrates a view of the top of the second collar of the present invention.

FIG. 8 illustrates a view of the top of the second collar 528 having an aperture 529 which corresponds dimensionally and approximately to the aperture 104.

Figure 9:
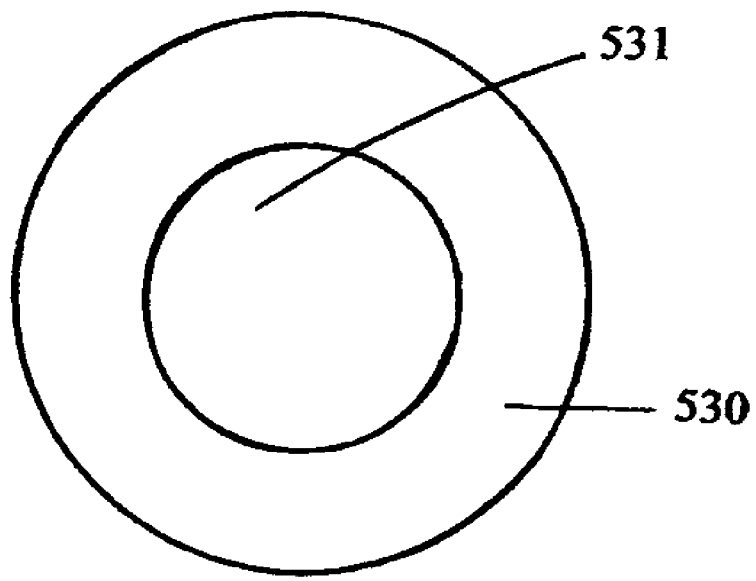
FIG. 9 illustrates a view of the top of the second sheet of the present invention.

FIG. 9 illustrates a view of the top of the second sheet 530 having an aperture 531 which corresponds dimensionally and approximately to the aperture 104.

Figure 10:
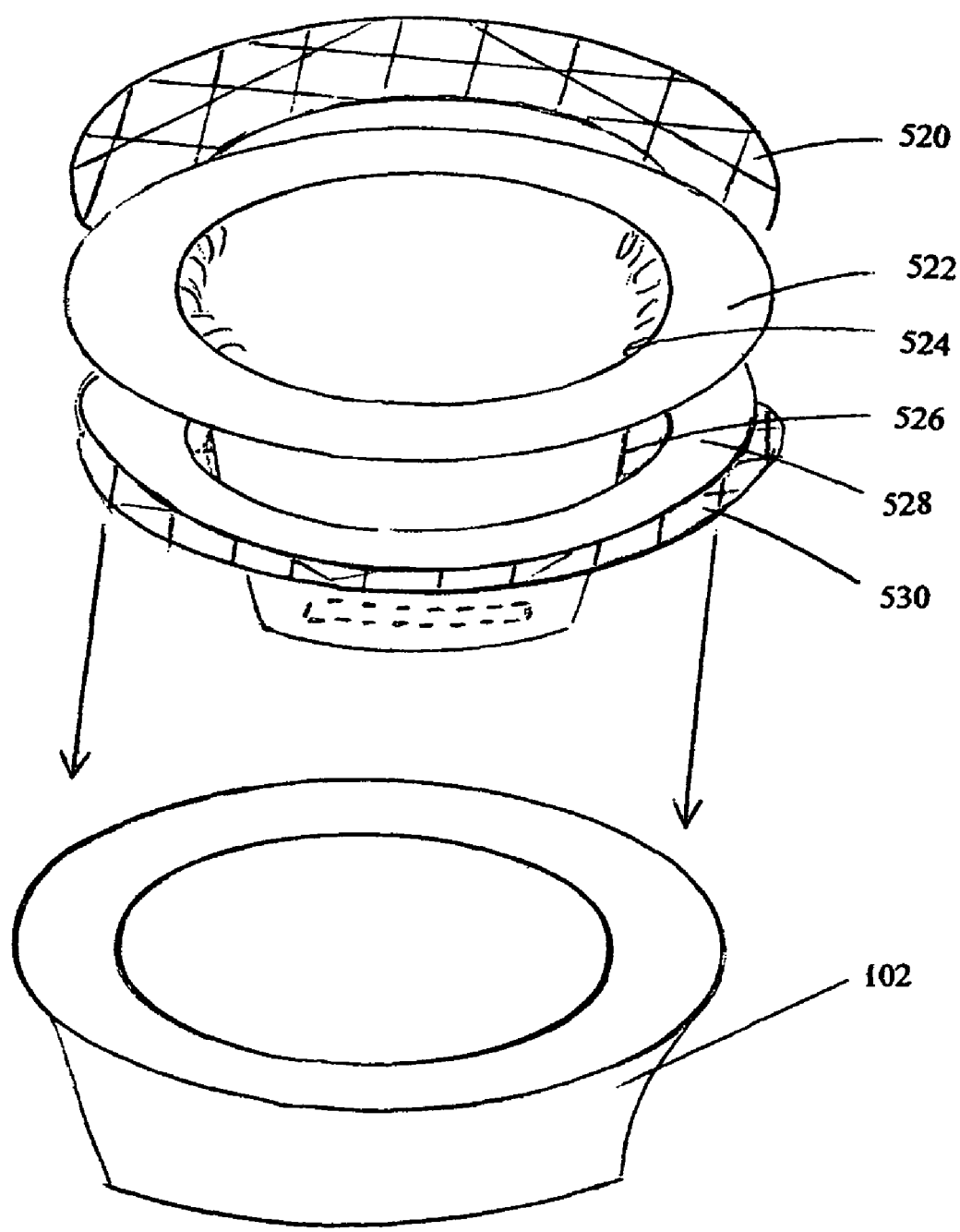
FIG. 10 illustrates a perspective view of the assembly of the base and insert of the present invention.

FIG. 10 illustrates a method of manufacture of the present invention. The annular base 102 is formed with aperture 104. The first collar 522 is attached to the inner container 524, to the outer container 526 and to the second collar 528. The first sheet 520 covers the top of the first collar 522, and the second sheet 530 covers the bottom of the second collar 528.

The base 102 can be reused. The insert 410 is inserted into the base 102. The user places waste material into the insert 410, and the insert 410 is folded, removed and discarded to the refuse bag.

Figure 11:
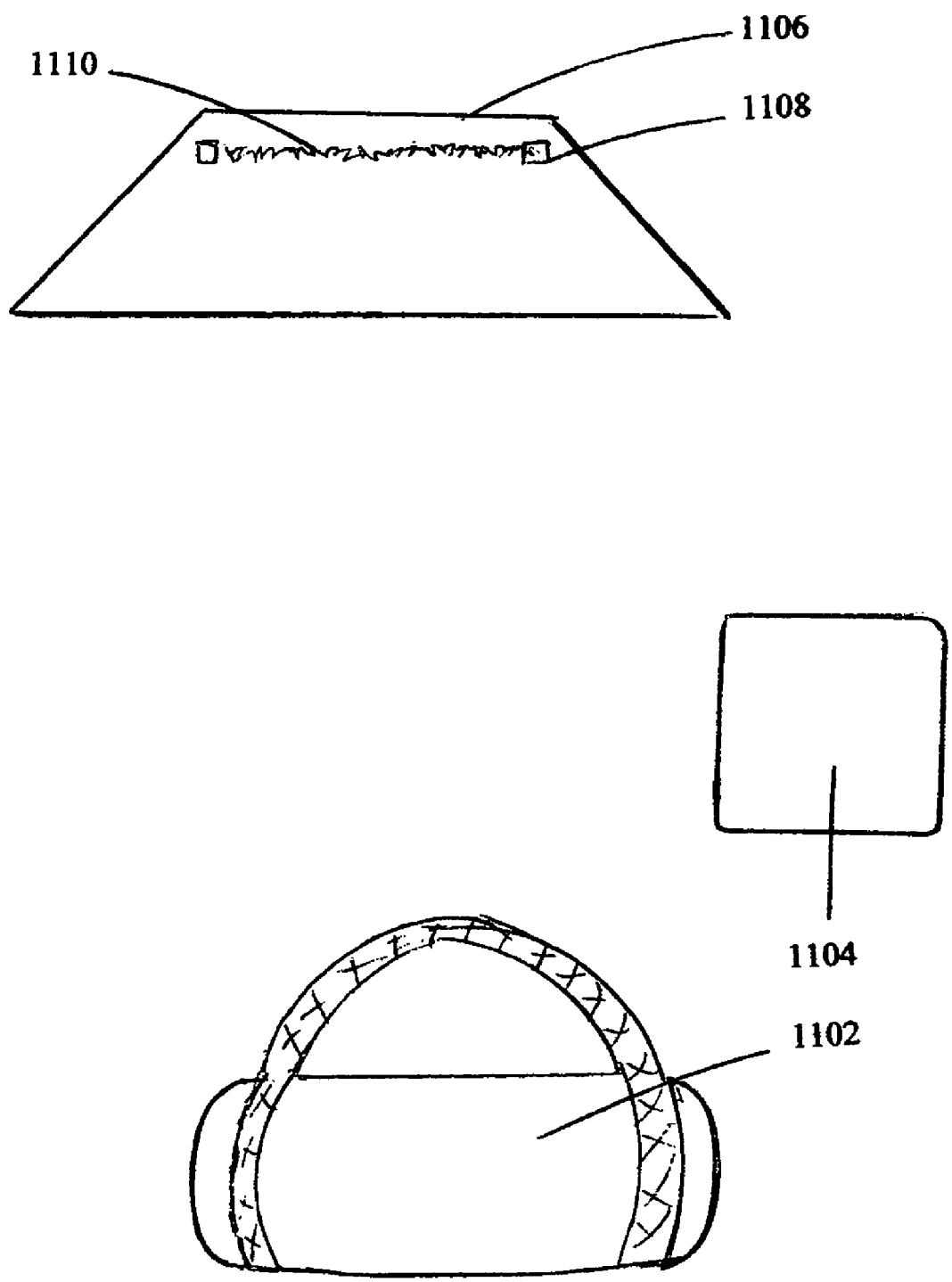
FIG. 11 illustrates a view of additional elements of the system of the present invention.

The system of the present invention includes the base 104 the insert 410 and the articles shown in FIG. 11. In FIG. 11, a storage case 1102 is illustrated for portability, and an apron 1106 is illustrated which may be rectangular or trapezoidal in shape and include elastic band 1110 and an attachment apparatus 1108. Additionally FIG. 11 illustrates a protective sheet 1104 to lay down on the seat of the vehicle.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A portable toilet for holding waste, comprising:
a base having an aperture;
an insert for being mounted in said base;
said insert including a first collar, a first container, a second collar, a second container, a first sheet and a second sheet;
said insert including a pad between said first container and said second container,
wherein the first collar, the first container, a second collar and the second container are attached together at a periphery of the insert,
wherein the first sheet extends over a top surface of the first collar and the second sheet extends over a bottom surface of the second collar,
wherein the first sheet is formed from absorbent material and the second sheet is formed from absorbent material.

2. A portable toilet for holding waste as in claim 1, wherein said pad is absorbent.

3. A portable toilet for holding waste as in claim 1, wherein said pad is super absorbent.

4. A system for a portable toilet for holding waste, comprising:
a base having an aperture;
an insert for being mounted in said base;
said insert including a first collar coupled to a first container, a second collar, and a second container, a first sheet and a second sheet,
said insert including a super absorbent pad between said first container and said second container, wherein the first collar, the first container, a second collar and the second container are attached together at a periphery of the insert, wherein the first sheet extends over a top surface of the first collar and the second sheet extends over a bottom surface of the second collar, wherein the first sheet is formed from absorbent material and the second sheet is formed from absorbent material.

5. A system for a portable toilet for holding waste as in claim 4, wherein said pad is absorbent.

6. Amended) A system for a portable toilet for holding waste as in claim 4, wherein said second sheet is water resistant.

7. A system for a portable toilet for holding waste as in claim 4, wherein said pad includes layers and is formed from super absorbent material.

8. A system for a portable toilet for holding waste as in claim 4, wherein said system includes a sheet to cover a portion of a seat.

9. A system for a portable toilet for holding waste as in claim 4, wherein said system includes an apron for a user to wear.

10. A system for a portable toilet for holding waste as in claim 4, wherein said system includes a storage case.

11. A system for a portable toilet for holding waste as in claim 4, wherein said base includes a biodegradable material.

12. A system for a portable toilet for holding waste as in claim 4, wherein said insert includes a biodegradable material.

13. A system for a portable toilet for holding waste as in claim 4, wherein said first collar includes a biodegradable material.

14. A system for a portable toilet for holding waste as in claim 4, wherein said second sheet includes a biodegradable material.

\* \* \* \* \*